United States Patent [19]
Vong

[11] 4,217,392
[45] Aug. 12, 1980

[54] COATED GLASS ARTICLE

[75] Inventor: Sandy T. S. Vong, Ann Arbor, Mich.

[73] Assignee: Ford Motor Company, Dearborn, Mich.

[21] Appl. No.: 49,716

[22] Filed: Jun. 18, 1979

[51] Int. Cl.² .......................................... B32B 17/06
[52] U.S. Cl. .................................................. 428/432
[58] Field of Search ....................... 428/426, 432, 433

[56] References Cited

U.S. PATENT DOCUMENTS

| | | | |
|---|---|---|---|
| 3,694,299 | 9/1972 | Wagner | 428/432 |
| 3,695,908 | 10/1972 | Szupillo | 428/432 |
| 4,041,436 | 8/1977 | Kouchick et al. | 428/432 |
| 4,148,940 | 4/1979 | Breininger et al. | 428/432 |
| 4,169,182 | 9/1979 | Seki et al. | 428/432 |

*Primary Examiner*—William J. Van Balen
*Attorney, Agent, or Firm*—William E. Johnson; Keith L. Zerschling

[57] ABSTRACT

This specification teaches a new article of manufacture which is a glass substrate having a coating thereon selected from the group of glass coating compositions consisting essentially of chromium oxide, cobalt oxide and iron oxide lying within the enclosed area designated by the letter "A" in FIG. 1.

3 Claims, 1 Drawing Figure

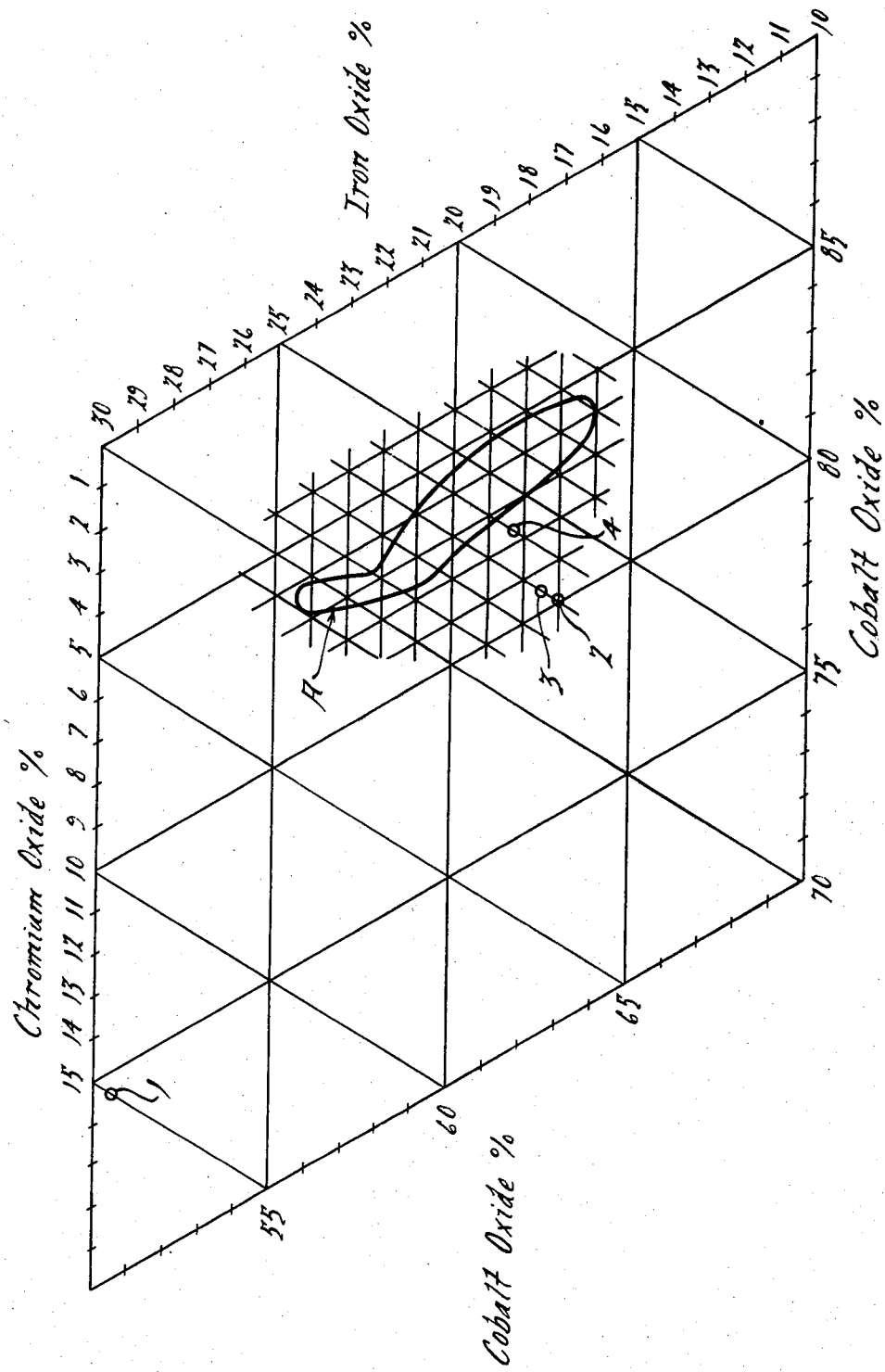

COATED GLASS ARTICLE

BACKGROUND OF THE INVENTION

It is known in the art to apply mixtures of organic materials containing metals such as chromium, iron and cobalt to a heated glass surface in order to develop a coating on that surface consisting of the oxides of the three mentioned metals. When the organic based material is applied to a heated glass sheet, the organic portion of the spray volatilizes leaving the oxide form of the metal therebehind.

I have discovered that if the composition of the coating on the glass surface falls within a certain range with respect to the chromium, iron and cobalt oxide content thereof, the coating is more durable than coatings having compositions falling outside of the particular area I have discovered. I have also tested compositions available on the commerical market. These compositions are glasses having a coating thereon consisting of the oxides of chromium, iron and cobalt. In each case, I have found that the commerically available coated glass substrates have oxide compositions falling outside of the range I now find to be the range of the most durable films. In each case, the coated glass product aviailable to the commercial market did not have the superior surface coating qualities that I have found if the oxide composition on the glass surface falls within the range I have discovered.

SUMMARY OF THE INVENTION

This invention relates to a new article of manufacture, and, more particularly, to a new article of manufacture which comprises a glass substrate with a coating on the glass substrate selected from the group of glass coating compositions consisting essentially of chromium oxide, cobalt oxide and iron oxide laying within the enclosed area designated by the letter "A" in FIG. 1. Broadly, these compositions fall in a range of chromium oxide from about 5% to about 8%, iron oxide from about 16% to about 24½%, and cobalt oxide from about 69% to about 78½%. These ranges are approximate ranges and the specific compositions included within my invention are those falling within the area designated by the letter "A" in FIG. 1. I have found that if compositions falling within this area are developed on a glass substrate, the coating has a greater durability than coatings falling outside of this area. The greater durability is shown by two testing procedures which will be described hereinbelow.

The preferred glass substrate upoon which the coating is developed is a glass substrate which has a green body color thereto. A particular composition of such a green body colored glass is disclosed in a latter portion of this specification.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing in which:

The FIGURE is a tri-axial diagram indicating within the enclosed area designated by the letter "A" the various compositions of the three oxides forming a coating on a glass substrate which provide an improved and more tenacious coating than the coatings formed by compositions falling outside of the enclosed area.

DESCRIPTION OF THE PREFERRED EMBODIMENT

It is known in the art that the application of an organic material containing the metals chromium, iron and cobalt to a glass surface will develop a coating on that glass surface. The glass surface must be heated to a temperature sufficient to cause a volatilization of the organic portion of the spray materials and an oxidizing of the metallic components thereof to their respective metallic oxides.

The commercially available coated glass substrates known to me are indicated in the tri-axial drawing of FIG. 1. The number 1 indicates the composition of a coated surface of a coated glass product manufactured by a French company. Number 2 indicates the composition of a coated glass product having a nominal thickness of 7/32 inch manufactured by a United States company. Number 3 indicates the general coating composition of a 7/32 inch nominal thickness glass product manufactured by a United States company. Number 4 indicates a ⅛ inch nominal thickness coated glass product manufactured by a United States company. In all four cases, the compositions fall outside of the area designated by the letter "A" in FIG. 1. In all cases, the coated surface did not have a duruability as good as the durability of compositions located in the aforementioned area designated by the letter "A".

Durability of the coatings was tested by two procedures. A first procedure is one in which a coated sample is subjected to a five hour hydrochloric acid vapor test. In this case, hydrochloric acid vapors surrounded the material and would attack the coating on the glass. An attack of the coating changes the level of transmission of solar energy through the glass. There is a greater amount of energy transmitted as the durability or the film is attacked. A change in transmission charactertistics of the coated glass to the transmission of energy therethrough is considered acceptable if it is in a range of 15% or less, any greater change of the film being considered unacceptable.

The second test is a test in which the sample is heat tempered initially. Thereafter, the tempered test sample is subjected to a humidity test in which the sample is subjected to a 100% humidity at 120° F. for a period of 6 weeks. This high humidity can cause the coating on the surface to loose its adherence to the surface and come free. The measurement of durability is that the surface coating stays in place for the prolonged period of time and no less than 1% of the coating is removed therefrom. If any greater amount of material is removed, the sample is rejected as failing.

Reference is now made to FIG. 1. In FIG. 1 there is an enclosed area generally designated by the letter "A". I have found that if the oxide content of the coating on a glass ribbon falls within the area identified, it generally passes both of the above-described testing procedures. This area is generally bounded or falls in a range of from 5 to 8% chromium oxide, from 16 to 24½% iron oxide, and from 69 to 78.5% cobalt oxide. However, the area defined is one which has some variation and the particular film composition should fall within the area in order to achieve the better uniform film characterisities.

In accordance with a preferred embodiment of the method of this invention, the glass to be coated consists of a glass which has a greenish body color and is made from a melt of the following materials: $SiO_2$—65 to 74% by weight; $Na_2O$—11 to 15% by weight; $K_2O$—0 to 5% by weight; CaO—6 to 15% by weight; MgO—1 to 6% by weight; $Fe_2O_3$—0.2 to 0.8% by weight; and $Al_2O_3$—0 to 5% by weight, with CaO+MgO being about 13% by weight.

The glass is melted in a glass melting chamber and flowed out upon a tin bath as is done in the float process. The glass ribbon manufactured by this process is withdrawn from the glass manufacturing chamber. While still heated to a temperature of about 1000° F.±200° F. upon its emergence from the float glass chamber, the glass ribbon is sprayed with a solution of chromium, iron and cobalt in an organic vehicle. In accordance with the proportions of the material in the original spray, the three metallic materials are oxidized to form a metallic oxide coating on the glass having the three metals present. As stated previously, I have found that if the three metallic elements are present in the final film composition, in accordance to the percentages indicated in the enclosed area of Figure "A", the coating on the glass sheet will be of higher quality with respect to the two testing procedures described than a composition which falls outside of the range.

Also, as previously stated, compositions 1, 2, 3 and 4 are compositions found on commercially available coated glass products. In all cases, the compositions lie outside of the designated area and in all of these cases the compositions failed one or both of the above-described tests.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. As a new article of manufacture: a glass substrate; and
   a coatiing on said glass substrate selected from the group of glass coating compositions consisting essentially of chromium oxide, cobalt oxide and iron oxide lying within the enclosed area designated by the letter "A" in FIG. 1.

2. The new article of manufacture as defined in claim 1 wherein said glass substrate is a green body colored glass.

3. The new article of manufacture as defined in claim 2 wherein said green body colored glass has the following composition: $SiO_2$—65 to 74% by weight; $Na_2O$—11 to 15% by weight; $K_2O$ 0 to 5% by weight; CaO—6 to 15% by weight; MgO—1 to 6% by weight; $Fe_2O_3$—0.2 to 0.8% by weight; and $Al_2O_3$—0 to 5% by weight, with CaO+MgO being about 13% by weight.

* * * * *